(12) United States Patent
Puhala et al.

(10) Patent No.: US 9,469,764 B2
(45) Date of Patent: Oct. 18, 2016

(54) DEODORIZED ASPHALT ADDITIVE COMPOSITION

(75) Inventors: Aaron S. Puhala, Kent, OH (US);
Michael S. Ivany, Aurora, OH (US);
James W. Hoover, North Canton, OH (US)

(73) Assignee: Flow Polymers, LLC, Cleveland, OH (US)

( * ) Notice: Subject to any disclaimer, the term of this patent is extended or adjusted under 35 U.S.C. 154(b) by 799 days.

(21) Appl. No.: 13/368,469

(22) Filed: Feb. 8, 2012

(65) Prior Publication Data

US 2012/0204760 A1    Aug. 16, 2012

Related U.S. Application Data

(60) Provisional application No. 61/442,858, filed on Feb. 15, 2011.

(51) Int. Cl.
| | | |
|---|---|---|
| *C09D 101/00* | (2006.01) | |
| *C09D 131/04* | (2006.01) | |
| *C09D 195/00* | (2006.01) | |
| *C08L 95/00* | (2006.01) | |

(52) U.S. Cl.
CPC .......... *C08L 95/00* (2013.01); *C09D 195/00* (2013.01); *C08L 2555/62* (2013.01)

(58) Field of Classification Search
None
See application file for complete search history.

(56) References Cited

U.S. PATENT DOCUMENTS

| | | | |
|---|---|---|---|
| 3,813,259 A | 5/1974 | Reuben et al. ............... 117/100 |
| 4,172,123 A * | 10/1979 | Lowicki ......................... 424/67 |
| 4,271,213 A | 6/1981 | Grimm et al. ................ 427/222 |
| 5,271,767 A | 12/1993 | Light, Sr. et al. ............ 106/246 |
| 5,989,662 A | 11/1999 | Janicki et al. ............... 428/35.7 |
| 6,107,373 A | 8/2000 | Janicki et al. .................. 524/59 |
| 6,461,421 B1 | 10/2002 | Ronvak .......................... 106/285 |
| 6,488,988 B2 | 12/2002 | Trumbore .................. 427/376.1 |
| 6,987,207 B1 | 1/2006 | Ronvak ............................. 585/3 |
| 7,037,955 B2 | 5/2006 | Timcik et al. ................ 523/102 |
| 7,306,666 B2 | 12/2007 | Timcik et al. ........... 106/287.24 |
| 8,057,881 B2 * | 11/2011 | Fay et al. ....................... 428/141 |
| 2004/0166087 A1 | 8/2004 | Gembala ...................... 424/76.1 |
| 2005/0223668 A1 | 10/2005 | Thompson et al. ......... 52/404.1 |
| 2006/0155003 A1 | 7/2006 | Timcik et al. ................ 523/102 |
| 2007/0213418 A1 | 9/2007 | Vermilion et al. .............. 521/83 |
| 2009/0314184 A1 | 12/2009 | Quinn et al. ................ 106/281.1 |

* cited by examiner

*Primary Examiner* — Colin W Slifka

(74) *Attorney, Agent, or Firm* — Alvin T. Rockhill

(57) ABSTRACT

This invention is based upon the discovery that a hydroxylated carboxylic acids which contain at least 17 carbon atoms and zinc, aluminium, or alkaline earth metal salts thereof, such as zinc ricinoleate, act effectively as deodorants in asphalt and asphalt containing compositions. The present invention more specifically discloses an asphalt additive composition which is comprised of (1) an asphalt, (2) 0.05 weight percent to about 4 weight percent of a partitioning agent, and (3) at least 0.1 weight percent of a deodorant selected from the group consisting of (a) a hydroxylated carboxylic acid which contains at least 17 carbon atoms and (b) an aluminium, zinc, or alkaline earth metal salt of a hydroxylated carboxylic acid which contains at least 17 carbon atoms. In many applications it is beneficial for the asphalt additive composition to further include 0.5 weight percent to about 50 weight percent of a polymer additive.

18 Claims, No Drawings

DEODORIZED ASPHALT ADDITIVE COMPOSITION

This application claims benefit of U.S. Provisional Patent Application Ser. No. 61/442,858, filed on Feb. 15, 2011. The teachings of U.S. Provisional Patent Application Ser. No. 61/442,858 are incorporated herein by reference in their entirety.

FIELD OF THE INVENTION

This invention relates generally to asphalt compositions and hot or cold process coal tar compositions having a reduced level of objectionable odors. The subject invention specifically relates to asphalt additive compositions which exhibit a reduced level of odors and which are useful in modifying plastic compositions.

BACKGROUND OF THE INVENTION

The outstanding binding, insulating, and waterproofing characteristics of asphalt have led to its widespread utilization in a wide variety of applications including paving, roofing, weather sealing, waterproofing, and polymer modification. For instance, asphalt is used in manufacturing roofing shingles because it has the ability to bind sand, aggregate, and fillers to the roofing shingle while simultaneously providing excellent water barrier characteristics. Asphalt compositions are additionally used as processing aids for plastics.

For hundreds of years, naturally occurring asphalts have been used in numerous applications. However, today virtually all of the asphalt used in industrial applications is recovered from petroleum refining. Asphalt, or asphalt flux, is essentially the residue that remains after gasoline, kerosene, diesel fuel, jet fuel, and other hydrocarbon fractions have been removed during the refining of crude oil. In other words, asphalt flux is the last cut from the crude oil refining process.

One age-old downside associated with using hot mix asphalt is that it produces volatile materials such as hydrocarbons, sulfides, and mercaptans which generally have strong, persistent, and unpleasant odors. These odors are frequently considered to be obnoxious by persons working with the asphalt, by residents living near areas where asphalt is manufactured or paving is being done, and in general to persons who come within close proximity to the asphalt. The intensity of the unpleasant odor associated with asphalt increases with increasing temperature. Accordingly, the odor problem associated with asphalt can be severe in cases where it is heated to an elevated temperature, such as in industrial applications.

The foul odors that accompany paving roads, driveways, and parking lots are well recognized by most people in modern society. When asphalt is used in roofing applications, such as roofing shingles, roll roofing, and built-up roofing, the asphalt is typically first heated in a vessel, such as a gas-fired roofing kettle. Asphalt compositions used in plastics modification are also typically heated to an elevated temperature in mixing and processing the polymeric formulation. As the temperature of the asphalt is increased, volatile materials, such as hydrocarbons, sulfides, and mercaptans which have strong and unpleasant odors are normally emitted into the atmosphere. The odors emitted are not only unpleasant to smell, but they may also be an irritant to workers and/or other individuals in the vicinity of the vessel or to those who come within close proximity to the hot asphalt. In extreme cases, the rank fumes from the asphalt may cause headaches and/or irritation to the eyes and mucus membranes of the nose and throat, which can result in a deterioration of worker productivity and/or an increase in the number of sick days taken by workers.

Traditional odor treating compositions act as deodorizers or masking agents, function by overwhelming the undesired odor with another odor. Such techniques, however, are poor at masking strong odors. In addition, masking does not reduce the concentration of the volatiles causing the underlying undesirable odors. Accordingly, the need for an effective technique for reducing the obnoxious odors associated with asphalt containing compositions is well recognized by industrial users of asphalt and the general public.

Compositions and odor-masking additives for reducing undesirable odors emitted from odor-causing compounds are known in the art. For instance, U.S. Pat. No. 5,271,767 discloses a composition that consists essentially of (1) liquid asphalt, hot-mix asphalt, hot-mix, or cold lay asphalt with added latex and (2) an additive that contains a citrus terpene (4-isopropyl 1-methylcyclohexene) D-limonene mixed with a vegetable oil such as cottonseed oil, soya oil, rapeseed (canola) oil, peanut oil, etc. and a silicone oil dispersant. It is taught that when 0.5-1.0 parts of the composition are mixed with 99.0-99.5 parts liquid asphalt, the resulting liquid asphalt composition is substantially free of objectionable odors.

U.S. Pat. Nos. 5,989,662 and 6,107,373 disclose methods of reducing fumes produced from a kettle of molten asphalt that includes adding about 0.25 to about 6.0% by weight of a polymer (e.g. polypropylene) to the asphalt. The polymer material preferably forms a skim or skin across substantially the entire upper surface of the asphalt. These patents teach that at least a 25% reduction of the visual opacity of the fumes, at least a 20% reduction of the hydrocarbon emissions of the fumes, and at least a 15% reduction of suspended particulate emissions of the fumes is obtained.

U.S. Pat. No. 6,461,421 discloses a composition that includes (1) an odor-emitting hydrocarbonaceous material, (2) an odor-suppressing amount of an aldehyde or a ketone, and (3) a carboxylic acid ester. The odor-emitting hydrocarbonaceous material may be any hydrocarbonaceous material that emits objectionable odors at ambient or elevated temperatures. One example of a hydrocarbonaceous material given is asphalt. It is asserted that the composition significantly reduces the odor given off by asphalt.

U.S. Pat. No. 6,488,988 discloses a method and container for reducing the fuming of asphalt in a heated vessel. Trumbore teaches that a substantially insoluble blanket material is added to the liquid asphalt to form a skim on the surface of the asphalt and reduce the fuming. Examples of blanket materials include polyurethane, polyethylene terephthalate, ground soda bottles, starch, and cellulosic materials.

U.S. Pat. No. 6,987,207 discloses a composition that includes an odor-emitting hydrocarbonaceous material and an odor-suppressing amount of an additive composition that includes (1) a soy methyl ester, (2) at least one aldehyde and/or at least one ketone, and (3) at least one carboxylic acid ester. This patent teaches that the odor-emitting hydrocarbonaceous material may be any hydrocarbonaceous material that emits objectionable odors at ambient or elevated temperatures, such as asphalt. It is asserted that the use of the additive composition may significantly reduce or eliminate the odor emitted by the hydrocarbonaceous material.

U.S. Pat. No. 7,037,955 and United States Patent Publication No. 2006/0155003 disclose methods for reducing odor in an oil based medium such as asphalt. In the disclosed methods, an essential oil is added to the oil based medium in an odor reducing amount. The essential oil may be one or more essential oils or essential oil components, and includes natural extracts of various products of aromatic plants and trees. Essential oils for use in the invention include ajowan, angelica root, angelica seed, aniseed china star, carrot seed, and fir needle, among many others. Examples of essential oil components include terpenes, alcohols, aldehydes, aromatics, phenolics, esters, terpene derivatives, non-terpene essential oil components, and terpene derivatives.

U.S. Pat. No. 7,306,666 discloses a method for reducing odor in oil based media, said method comprising mixing an odor reducing amount of an odor reducing additive with an oil based medium, wherein the odor reducing additive is a mixture of essential oils, a mixture of essential oil components, or mixtures thereof, wherein the odor reducing additive is diluted with a carrier oil, which is comprised of methyl esters of canola oil, ethyl esters of canola oil, the methyl ester of soybean oil, or a mixture thereof; and wherein the oil based medium is fuel oil, waste oil fuel oil, oil based synthetic lubricants, liquid asphalt cement, or hot mix asphalt. Some examples of odor reducing additives that can be utilized in conjunction with this method include essential oils selected from the group consisting of rosemary oil, cedarwood oil, pine needle oil, eucalyptus oil, clove oil, thyme oil, vetiver oil, vanilla oleo resin, lavender oil, and tea tree oil; terpenes selected from the group consisting of α-pinene, β-pinene, d 3 carene, dipentene, p-cymene, cineole, camphor, terpineol, bornyl acetate, cedrene, cedrol, and thymol; and other substances including limonene, pine extract and pine white oil, *pinus sylvestris* oil, anise seed oil, clove bud oil, aniseed oil, camphor white oil, cedarwood atlas oil, cedarwood texas oil, cedarwood virginia oil, lavandin absolute, lime distilled oil, olibanum extract, rosemary oil, sandlewood west indian oil, tocopherol alpha, and vanilla.

United States Patent Publication No. 2004/0166087 discloses the addition of two specific types of ingredients to cold or hot melt asphalt or coal tar for the dual purposes of holding, reducing or complexing the obnoxious and toxic odors from asphalt while at the same time allowing a pleasant masking fragrance to predominate. The holding agents consist of various organic compounds which can bond or complex with and effectively hold onto other molecules. Typical complexing agents include dialkylgylcol alkyl ethers and dialkylphthalates. Typical fragrances include natural and synthetic oils or extracts such as lemon oil, orange oil, peppermint, spearmint, cinnamon, bubble gum and most other common fragrances. United States Patent Publication No. 2004/0166087 specifically reveals an asphalt formulation that contains 91 weight percent hot melt asphalt, 4.5 weight percent cinnamon oil, and 4.5 weight percent diethyl phthalate.

United States Patent Publication No. 2005/0223668 discloses a faced fibrous insulation assembly that includes a fibrous blanket, a facing formed by a kraft paper sheet material, and an asphalt coating layer on the inner surface of the facing that bonds the facing to the fibrous insulation blanket. The asphalt coating layer contains an odor-reducing additive in an amount to substantially eliminate odors that would otherwise be emitted by the asphalt coating layer. It is asserted that the additive does not adversely affect the adherent qualities of the asphalt coating layer. It is disclosed that the odor-reducing additive may be essential plant oils.

United States Patent Publication No. 2009/0314184 A1 discloses a composition for reducing malodorous emissions from hydrocarbonaceous materials comprising: at least one aldehyde-containing compound having a molecular weight greater than about 100 daltons and a boiling point greater than about 375° F., said composition being free of ester-containing compounds. In one embodiment of this invention the composition further includes one or more members selected from the group consisting of ketone-containing compounds, a low fuming additives and liquid carriers. In these compositions the aldehyde-containing compound can be 2-chlorobenzaldehyde, 4-chlorobenzaldehyde, alpha-methylcinnamaldehyde, 4-anisaldehyde, epsilon-cinnamaldehyde, vertraldehyde, 4-ethoxy-3-methoxybenzaldehyde, 3-ethoxy-4-hydroxybenzaldehyde, 3-nitrobenzaldehyde, vanillin or cinnamaldehyde. The ketone-containing compound that are reported to be useful in such compositions include camphor, isophorone, isobutyrophenone, propiophenone, 4-methylacetophenone, carvone, 4-chloroacetophenone, 2-benzoylbenzoic acid, 2'-acetonaphthone, benzophenone, fluorenone, 4'-ethoxyacetophenone, 4'-chlorobenzophenone, 4-acetylbenzonitrile and 4'-hydroxyacetophenone.

United States Patent Application Publication No. 2007/0213418 discloses a compound comprising a combination of materials for manufacturing a plastic product, comprising: a blend of asphalt and resin, the asphalt being included in an amount within a range of from about 0.1% to about 40% by weight of the plastic product; and wherein the asphalt functions as at least one of (i) a colorant to change the color of the plastic product; (ii) a resin replacement to reduce the amount of resin in the plastic product, (iii) a processing aid; and (iv) an additive to increase the R-Value of a foam insulation. However, this reference does not disclose or suggest any means for mitigating the strong odor associated with the asphalt used therein.

Conventional odor treating compositions commonly act as deodorizers or masking agents, essentially overwhelming the undesirable odor with one or more desirable odors. However, these compositions do not effectively mask the odors emitted from asphalt. Thus, there remains a need in the art for a composition that effectively reduces or eliminates the odors emitted from asphalt or other hydrocarbonaceous materials without simply masking the undesirable smell, where the performance of the composition is sustainable over time, and where the composition does not pose any additional health or safety issues.

SUMMARY OF THE INVENTION

This invention is based upon the discovery that hydroxylated carboxylic acids which contain at least 17 carbon atoms and aluminum, zinc, and alkaline earth metal salts thereof, such as zinc ricinoleate, act effectively as deodorants in asphalt and asphalt containing compositions. The present invention more specifically discloses an asphalt additive composition which is comprised of (1) an asphalt, (2), 0.05 weight percent to about 4 weight percent of a partitioning agent, and (3) at least 0.1 weight percent of a deodorant selected from the group consisting of (a) a hydroxylated carboxylic acid which contains at least 17 carbon atoms and (b) an aluminum, zinc, or alkaline earth metal salt of a hydroxylated carboxylic acid which contains at least 17 carbon atoms. The asphalt additive composition will preferably be in the form of free-flowing pellets to facilitate its utilization in modifying plastic formulations. In many applications it is high beneficial for the asphalt additive composition to further contain a polymer additive, such as polyethylene, polypropylene, or ethylene vinyl acetate (EVA) to attain desired characteristics. Polymer additives will normally be included in the asphalt additive compositions of this invention at a level which is within the range of about 0.5 weight percent to about 50 weight percent, will typically be included at a level which is within the range of about 0.5 weight percent to about 30 weight percent, and will more typically be included at a level which is within the range of about 3 weight percent to about 15 weight percent. In many cases the asphalt additive compositions of this invention will be included at a level which is within the range of about 3 weight percent to about 12 weight percent.

The asphalt additive compositions of this invention are beneficial in modifying plastic formulations to improve processing characteristics, as a homogenizing agent, as an adhesion promoting agent, as a resin replacement or supplement, as an insulating agent, and as a black colorant. The asphalt additive compositions of this invention are typically added to plastics formulations at a level which is within the range of about 2 parts by weight to 25 parts by weight per 100 parts by weight of the plastic. The asphalt additive compositions of this invention are more typically added to plastics formulations at a level which is within the range of about 2 parts by weight to 10 parts by weight per 100 parts by weight of the plastic.

The present invention further reveals a modified plastic composition which is comprised of at least one thermoplastic resin and from about 2 weight percent to about 25 weight percent of an asphalt additive composition which is comprised of (1) an asphalt, (2) 0.05 weight percent to about 4 weight percent of a partitioning agent, and (3) 0.1 weight percent to 5 weight percent of a deodorant selected from the group consisting of (a) a hydroxylated carboxylic acid which contains at least 17 carbon atoms and (b) an aluminum, zinc, or alkaline earth metal salt of a hydroxylated carboxylic acid which contains at least 17 carbon atoms.

The subject invention also discloses a cellulose expansion joint composition which is comprised of cellulose fibers and an asphalt additive composition which is comprised of (1) an asphalt, (2) 0.05 weight percent to about 4 weight percent of a partitioning agent, and (3) 0.1 weight percent to 5 weight percent of a deodorant selected from the group consisting of (a) a hydroxylated carboxylic acid which contains at least 17 carbon atoms and (b) an aluminum, zinc, or alkaline earth metal salt of a hydroxylated carboxylic acid which contains at least 17 carbon atoms. This composition is particularly useful in filling expansion joints (void space) between concrete slabs. For example, it can be used to fill the joint between a concrete driveway and the floor of a garage. Such expansion joints are typically between about 0.25 inch (6.35 mm) to about 1 inch (25.4 mm) wide and are more typically about 0.375 inch (9.5 mm) to about 0.625 inch (15.9 mm) wide.

The subject invention also discloses an asphalt impregnated fabric which is comprised of a woven or non-woven fabric having intersties therein, wherein said intersties contain an asphalt additive composition which is comprised of (1) an asphalt, (2) 0.05 weight percent to about 4 weight percent of a partitioning agent, and (3) 0.1 weight percent to 5 weight percent of a deodorant selected from the group consisting of (a) a hydroxylated carboxylic acid which contains at least 17 carbon atoms and (b) an aluminum, zinc, or alkaline earth metal salt of a hydroxylated carboxylic acid which contains at least 17 carbon atoms.

The subject invention further discloses a deodorized asphalt composition which is comprised of an asphalt and at least 0.1 weight percent of a deodorant selected from the group consisting of (a) a hydroxylated carboxylic acid which contains at least 17 carbon atoms and (b) an aluminum, zinc or alkaline earth metal salt of a hydroxylated carboxylic acid which contains at least 17 carbon atoms; wherein the asphalt composition is void of water. In some embodiments of this invention, deodorized asphalt compositions of this type are void of aggregate having a particle size of greater than 2 millimeters.

The present invention also reveals a method for preparing a deodorized asphalt composition which comprised mixing a deodorant selected from the group consisting of (a) a hydroxylated carboxylic acid which contains at least 17 carbon atoms and (b) an aluminum, zinc, or alkaline earth metal salt of a hydroxylated carboxylic acid which contains at least 17 carbon atoms, into an asphalt which is void of water, and wherein the mixing is conducted at a temperature which is within the range of about 250° F. to about 550° F.

DETAILED DESCRIPTION OF THE INVENTION

The deodorants used in the practice of this invention are sparingly water-soluble or water-insoluble salts of hydroxylated carboxylic acids containing at least 17 carbon atoms and various salts thereof. These carboxylic acids, in general, form water insoluble or sparingly soluble compounds with polyvalent metal cations, for example bivalent or trivalent cations. Suitable metal ions in this respect are those that do not catalyze the decomposition reactions of higher carboxylic acids, such as iron, copper or nickel. A second aspect with regard the choice of the cations in the active substances according to the present invention is that they should be physiologically harmless. Alkaline earth metals are, therefore, preferably used, especially magnesium and calcium, as well as aluminum and, above all, zinc. The zinc salts offer an additional advantage in that they show a pronounced fungistatic activity and are therefore especially important in application where fungus is a problem.

The anions of the salts are derived from higher carboxylic acids which can be saturated or unsaturated, and are preferably singly or multiply olefinically unsaturated, and show single or multiple hydroxylation. Suitable carboxylic acids are those having from 17 to 21 carbon atoms, preferably from 17 to 19 carbon atoms. A highly preferred saturated deodorant is zinc 12-hydroxystearate. These compounds are, in general, relatively inaccessible, which means that those unsaturated, hydroxylated carboxylic acids having 17 or more carbon atoms which are accessible are preferably used. These are primarily higher unsaturated, hydroxylated fatty acids. The most important naturally occurring member of this group is ricinoleic acid. The reaction products obtainable by hydroxylation of fatty acids with multiple points of unsaturation, for example, linoleic acid and linolenic acid, can however also be used. It is a relatively simple process to hydroxylate one of the two double bonds of this doubly olefinically unsaturated carboxylic acid by a mild oxidation treatment, so that doubly hydroxylated carboxylic acids which are still unsaturated are produced. These and similar carboxylic acids are especially important in the practice of the present invention.

The most important salts are the salts of zinc, magnesium and aluminum, of ricinoleic acid, ricinelaidic acid, dihydroxyoctadecane-acid, which may be easily obtained from linoleic acid, as well as the appropriate salts of carboxylic acids with multiple hydroxylation and single multiple unsaturation obtained from the oxidation of linoleic acid.

Zinc ricinoleate is a readily accessible compound and is therefore preferably used in the practice of the present invention. It possesses virtually no residual astringent action, so that an irritant action on the skin is absent.

Zinc ricinoleate is the zinc salt of 12-hydroxy-9-octadecenoic acid and is of the structural formula:

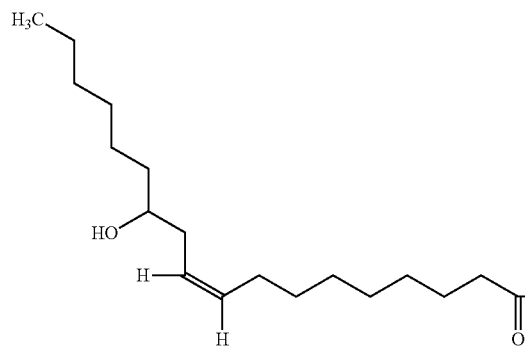 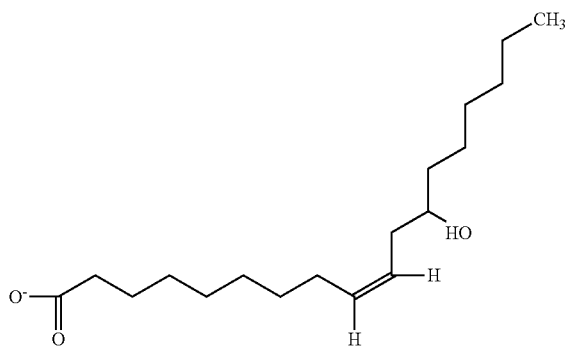

and was assigned CAS Number 52653-36-8.

In the practice of this invention, the deodorant is simply mixed into the asphalt or the asphalt composition being treated. The asphalt used will typically be void of water. The deodorant will, of course, be added at a level which is sufficient to eliminate undesired odors or to reduce such odors to an acceptable level. In most cases, the deodorant will be added at a level which is within the range of 0.1 weight percent to 5 weight percent. Typically, the deodorant will be added to the asphalt or the asphalt containing composition at a level which is within the range of 0.2 weight percent to 3 weight percent. In many cases the deodorant will be added to the asphalt or the asphalt containing composition at a level which is within the range of 0.6 weight percent to 2 weight percent. The deodorant will frequently be added to the asphalt or the asphalt containing composition at a level which is within the range of 0.8 weight percent to 1.5 weight percent.

The asphalt additive composition being treated will typically be heated to an elevated temperature to facilitate a homogeneous mixing of the deodorant throughout the asphalt additive composition. The temperature to which the asphalt additive composition is heated will depend upon the type of the asphalt used and the level and nature of additional components, such as the partitioning agent and any polymer additive, included in the asphalt additive composition. Normally, the asphalt additive composition will be heated to a temperature of at least about 250° F. (121° C.) to reduce the viscosity of the asphalt composition to a workable level for blending the deodorant therein. However, the asphalt composition will not typically be heated to a temperature of more than about 550° F. (288° C.) to limit thermally induced degradation of the asphalt and polymeric components of the asphalt additive composition. In general, the asphalt composition will be heated to a temperature which is within the range of about 325° F. (163° C.) to 500° F. (260° C.) to facilitate good mixing of the deodorant throughout the asphalt composition. Preferably the asphalt composition will be heated to a temperature which is within the range of about 400° F. (204° C.) to 475° F. (246° C.) to facilitate good mixing of the deodorant into the asphalt composition. It should be noted that the deodorant can be mixed into the asphalt composition with other constituents, such as polymer additives, or it can be added in a separate mixing step. For instance, the deodorant can be added as the final step of the preparation of the asphalt additive composition. In the alternative, the deodorant can be added prior to or concurrently with other components of the asphalt additive composition or it can even be added prior to air-blowing in cases where industrial asphalt is utilized.

Virtually any asphalt can be utilized in making the asphalt additive compositions of this invention. However, the asphalt will typically be an oxidized asphalt to facilitate making the asphalt additive compositions of this invention into free-flowing pellets. The oxidized asphalt utilized in manufacturing the asphalt additive compositions of this invention will typically have a softening point which is within the range of 85° C. to 180° C. and a penetration value of less than 15 dmm. Preferably, the oxidized asphalt will have a softening point which is within the range of 100° C. to 170° C., and a penetration value which is less than 12 dmm. In some embodiments of this invention it is beneficial for the asphalt to have a penetration value of less than 5 dmm and in some applications it is desirable for the asphalt to have a penetration value of 0 dmm.

In some embodiments of this invention, the asphalt can be (1) a Type I asphalt which has a softening point of from 135° F. (57° C.) to 151° F. (66° C.) and a penetration of from 18 dmm to 60 dmm at 77° F. (25° C.), (2) a Type II asphalt which has a softening point of from 158° F. (70° C.) to 176° F. (80° C.) and a penetration of from 18 dmm to 40 dmm at 77° F. (25° C.), (3) a Type III asphalt which has a softening point of from 185° F. (85° C.) to 205° F. (96° C.) and a penetration of from 15 dmm to 35 dmm at 77° F. (25° C.), or (4) a Type IV asphalt which has a softening point of from 210° F. (99° C.) to 225° F. (107° C.) and a penetration of from 12 dmm to 25 dmm at 77° F. (25° C.).

Penetration values can be determined at room temperature or at an elevated temperature. Unless stated otherwise, penetration values are determined at room temperature. For purposes of this invention, asphalt softening points are measured following ASTM D 36-95 "Standard Test Method for Softening Point of Bitumen (Ring- and Ball Apparatus)" and asphalt penetrations are measured following ASTM D 5-97 "Standard Test Method for Penetration of Bituminous Materials".

The oxidized asphalt that can be utilized in the practice of this invention can be made by conventional air blowing techniques that are well known in the art to attain the desired softening point and penetration value. In such an air blowing procedure the asphalt is heated to a temperature which is within the range of 400° F. (204° C.) to 550° F. (288° C.) and an oxygen containing gas is blown (sparged) through it. This air blowing step will preferably be conducted at a temperature which is within the range of 425° F. (218° C.) to 525° F. (274° C.) and will most preferably be conducted at a temperature which is within the range of 450° F. (232° C.) to 500° F. (260° C.). This air blowing step will typically take about 2 hours to about 10 hours and will more typically take about 3 hours to about 6 hours. However, the air blowing step will be conducted for a period of time that is sufficient to attain the ultimate desired softening point and penetration value.

The oxygen containing gas (oxidizing gas) used in such an air blowing step is typically air. The air can contain moisture and can optionally be enriched to contain a higher level of oxygen or another oxidizing gas. For instance, chlorine enriched air or pure oxygen can also be utilized in the air blowing step. Air blow can be performed either with or without a conventional air blowing catalyst. However, to attain commercially viable reaction rates an air blowing catalyst is typically utilized. Some representative examples of air blowing catalysts include ferric chloride ($FeCl_3$), phosphorous pentoxide ($P_2O_5$), aluminum chloride ($AlCl_3$), boric acid ($H_3BO_3$), copper sulfate ($CuSO_4$), zinc chloride ($ZnCl_2$), phosphorous sesquesulfide ($P_4S_3$), phosphorous pentasulfide ($P_2S_5$), phytic acid ($C_6H_6[OPO—(OH)_2]_6$), and organic sulfonic acids.

The partitioning agent utilized in making the asphalt additive composition will typically be in the form of an inorganic powder and is typically selected from the group consisting of talc, clay, silica, calcium carbonate, wollastonite, glass fibers, and glass spheres. Organic soaps, such as zinc stearate, calcium stearate, and the like can also advantageously be used as partitioning agents in some embodiments of this invention. Polymeric partitioning agents can also be employed in some applications. To utilize the partitioning agent most efficiently, it will typically be dispersed on the surface of the pellets of the asphalt additive composition. In one embodiment of this invention, the partitioning agent can be a mixture of (i) a phenyl formaldehyde resin and (ii) a precipitated silica gel, a polyethylene wax, a polymethylene wax (Fisher-Tropsch wax), or a linear aliphatic hydrocarbon polymer. In another alternative embodiment of this invention, pellets of the asphalt additive composition can be coated with a fused resinous partitioning agent, such as polystyrene, polymethylmethacrylate, polyacrylonitrile, polyvinylchloride (PVC) or polyethylene. For instance, U.S. Pat. No. 3,813,259 describes the use of polymethylmethacrylate as a partitioning agent and U.S. Pat. No. 4,271,213 described the use of a mixture of styrene-butadiene copolymer resin and polymethylmethacrylate resin as a partitioning agent. The teachings of U.S. Pat. Nos. 3,813,259 and 4,271,213 are incorporated herein by reference for the purpose of describing such partitioning agents and the manner in which they are used to coat pellets to prevent them from agglomerating.

The partitioning agent will typically be incorporated onto pellets of the asphalt additive composition at a level which is within the range of about 0.05 weight percent to about 4 weight percent, based upon the total weight of the asphalt additive composition. The partitioning agent will more typically be incorporated onto the asphalt additive composition at a level which is within the range of about 0.1 weight percent to about 3 weight percent and will preferably be incorporated at a level of about 0.1 weight percent to about 2 weight percent. It is generally desirable to use the minimal amount of partitioning agent which is required to keep pellets of the asphalt additive composition of this invention in a free-flowing state. Pellets of the asphalt additive composition of this invention can be of various shapes that allow for good free-flow during storage, handling, and processing. For instance, the pellets of the asphalt additive composition can be in the form of pastilles, cubes, cylinders, discs, spheres, rods, briquettes, or granules. To attain the best possible free-flow characteristics it is normally preferred for the asphalt additive composition to be in the form of pellets having a generally spherical or cylindrical shape. The size of the pellets can vary widely. However, such pellets will typically weight from about 0.02 grams to about 0.8 grams and will more typically weigh from about 0.04 grams to about 0.5 grams. It is typically preferred for pellets of the asphalt additive composition of this invention have a weight which falls within the range of 0.08 grams to 0.2 grams.

The polymer additives which can optionally be incorporated into the asphalt additive compositions of this invention include EVA and polyolefin resins, such as polyethylene and polypropylene. The polymer additive (if any) will generally be incorporated into the asphalt additive composition at a level which is within the range of about 0.5 weight percent to about 50 weight percent, based upon the total weight of the asphalt additive composition. The polymer additive will commonly be incorporated into the asphalt additive composition at a level which is within the range of about 0.5 weight percent to about 30 weight percent. The polymer additive will typically be incorporated into the asphalt additive composition at a level which is within the range of about 1 weight percent to about 20 weight percent. The polymer additive will more typically be incorporated into the asphalt additive composition at a level which is within the range of about 2 weight percent to about 15 weight percent and will preferably be incorporated at a level which is within the range of 3 weight percent to 12 weight percent.

The asphalt additive compositions of this invention are beneficial in modifying plastic formulations to improve processing characteristics, as a homogenizing agent, as an adhesion promoting agent, as a resin replacement or supplement, as an insulating agent, and/or as a black colorant. The asphalt additive compositions of this invention are typically added to plastics formulations at a level which is within the range of about 2 parts by weight to about 25 parts by weight per 100 parts by weight of the plastic. The asphalt additive compositions of this invention are more typically added to plastics formulations at a level which is within the range of about 2 parts by weight to about 12 parts by weight per 100 parts by weight of the plastic. In most cases the asphalt additive compositions of this invention are added to plastics formulations in accordance with this invention at a level which is within the range of about 4 parts by weight to about 10 parts by weight.

The asphalt additive compositions of this invention can be used to modify the characteristics of virtually any type of thermoplastic polymer with the benefit of exhibiting only a minimal level of residual odor. For instance, the asphalt additives of this invention can be blended into polyolefin resins, polyamide resins, polyester resins, polycarbonate resins, and the like. For instance, a small amount of the asphalt additive composition of this invention can be blended into a plastic to improve its ability to be injection molded, blow molded, or extruded into a useful product. In some cases modifying the plastic with the asphalt additive composition of this invention improves throughput rates of molding equipment, reduces energy requirements, and reduces the incidence of defective parts. All of these potential benefits can result in significant cost savings industrial applications. In other cases, the modification of the plastic with the asphalt additive composition makes it possible to produce a given part with a particular plastic which could not otherwise be produced without the plastic modification. It should also be noted that the incorporation of the asphalt additive composition of this invention into a plastic can result in improved thermal insulation characteristics which can be beneficial in certain applications. In other applications the characteristic black color provided to the plastic by the asphalt additive composition can also be desirable.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

In this experiment 0.5 parts by weight of zinc ricinoleate was mixed into 99.5 parts by weight of oxidized asphalt having a softening point of 150° C. for 10 minutes at a temperature which was within the range of 450° F. (232° C.) to 475° F. (246° C.). This treated sample of asphalt was then qualitatively compared by a group of four people to a second sample of the same asphalt which was not treated with zinc ricinoleate. All four of the people in the test group independently reached the conclusion that the asphalt sample that was treated with zinc ricinoleate exhibited a significantly reduced level of odor as compared to the untreated sample which exhibited a odor which was characteristic of asphalt. This experiment accordingly shows that zinc ricinoleate can be incorporated into asphalt compositions to significantly reduce the odor level thereof.

While certain representative embodiments and details have been shown for the purpose of illustrating the subject invention, it will be apparent to those skilled in this art that various changes and modifications can be made therein without departing from the scope of the subject invention.

What is claimed is:

1. An asphalt composition which is comprised of (1) an asphalt, (2) 0.05 weight percent to about 4 weight percent of a partitioning agent, and (3) at least 0.1 weight percent of a deodorant, wherein the deodorant is zinc ricinoleate.

2. The asphalt composition as specified in claim 1 wherein the asphalt is an oxidized asphalt.

3. The asphalt composition as specified in claim 2 wherein the oxidized asphalt has a softening point which is within the range of 85° C. to 180° C.

4. The asphalt composition as specified in claim 1 wherein the asphalt additive composition is further comprised of 0.5 weight percent to about 50 weight percent of a polymer additive.

5. The asphalt composition as specified in claim 4 wherein the polymer additive is ethylene vinyl acetate.

6. The asphalt composition as specified in claim 4 wherein the polymer additive is a polyolefin resin.

7. The asphalt composition as specified in claim 6 wherein the polyolefin resin is selected from the group consisting of polyethylene and polylpropylene.

8. The asphalt composition as specified in claim 1 wherein the deodorant is present at a level which is within the range of 0.1 weight percent to 5 weight percent.

9. The asphalt composition as specified in claim 1 wherein said composition is in the form of free-flowing pellets.

10. The asphalt composition as specified in claim 9 wherein the partitioning agent is a fused resinous partitioning agent which is coated on the surface of the free-flowing pellets.

11. The asphalt composition as specified in claim 9 wherein the partitioning agent is a mixture of (i) a phenyl formaldehyde resin and (ii) a member selected from the group consisting of precipitated silica gels, polyethylene waxes, and a polymethylene waxes which is coated on the surface of the free-flowing pellets.

12. The asphalt composition as specified in claim 9 wherein the partitioning agent is a mixture of (i) a styrene-butadiene copolymer resin and (ii) a polymethylmethacrylate resin which is coated on the surface of the free-flowing pellets.

13. The asphalt composition as specified in claim 1 wherein the asphalt has a penetration value of less than 5 dmm.

14. The asphalt composition as specified in claim 1 wherein the partitioning agent is selected from the group consisting of talc, clay, silica, calcium carbonate, wollastonite, glass fibers, calcium stearate, and glass spheres.

15. A modified plastic composition which is comprised of at least one thermoplastic resin and from about 2 weight percent to about 15 weight percent of the asphalt composition specified in claim 1.

16. An asphalt composition which consists of (1) an asphalt, (2) 0.05 weight percent to 4 weight percent of a partitioning agent, (3) at least 0.1 weight percent to 5 weight percent of a deodorant, wherein the deodorant is zinc ricinoleate, and (4) 0.5 weight percent to 50 weight percent of a polymer additive.

17. The asphalt composition as specified in claim 16 wherein the polymer additive is present at a level which is within the range of 0.5 weight percent to 30 weight percent.

18. The asphalt composition as specified in claim 16 wherein the polymer additive is present at a level which is within the range of 1 weight percent to 20 weight percent.

* * * * *